United States Patent [19]

Zarechensky et al.

[11] 4,071,734

[45] Jan. 31, 1978

[54] POWDER ELECTRODE STRIP FOR SURFACING WITH WEAR-RESISTANT ALLOY

[76] Inventors: Anatoly Vasilievich Zarechensky, ulitsa Ilicha, 139, kv. 23; Alexei Afanasievich Kolechko, ulitsa Krasina, 19; Vladimir Mikhailovich Manov, prospekt Metallurgov, 35, kv. 89; Alla Grigorievna Korjukova, prospekt Stroitelei 70, kv. 118; Vasily Grigorievich Savran, ulitsa Volochaevskaya, 43a; Alexandr Nikitich Serenko, prospekt Metallurgov, 25/27, all of Zhdanov, U.S.S.R.

[21] Appl. No.: 638,859

[22] Filed: Dec. 8, 1975

[51] Int. Cl.² .......................................... B23K 35/368
[52] U.S. Cl. .............................................. 219/146.31
[58] Field of Search ................ 219/137 WM, 145, 146

[56] References Cited

U.S. PATENT DOCUMENTS

| | | | |
|---|---|---|---|
| 3,318,729 | 5/1967 | Siegle et al. | 219/146 X |
| 3,424,892 | 1/1969 | Wilcox | 219/146 X |
| 3,511,646 | 5/1970 | Von Scheele et al. | 219/137 WM X |
| 3,539,765 | 11/1970 | Duttera et al. | 219/146 |
| 3,853,611 | 12/1974 | Godai et al. | 219/145 X |

*Primary Examiner*—J. V. Truhe
*Assistant Examiner*—N. D. Herkamp
*Attorney, Agent, or Firm*—Lackenbach, Lilling & Siegel

[57] ABSTRACT

A powder electrode strip for surfacing with a wear-resistant alloy consisting of steel shell filled with a powdered mixture containing the following components in appropriate proportions to the total weight of the powder electrode strip: from 12 to 13 wt.% metallic chromium; from 20 to 22 wt.% iron powder; from 0.2 to 0.3 wt.% graphite; from 1 to 1.2 wt.% ferrochromium with a 0.6–0.8 wt.% carbon content; crystalline silicon or silicocalcium evaluated in terms of silicon at 0.6 to 0.8 wt.%; from 14 to 16 wt.% metallic manganese; from 2 to 3 wt.% titanium dioxide, from 0.6 to 1 wt.% titanium powder, and the balance is now represented by the steel shell.

2 Claims, No Drawings

POWDER ELECTRODE STRIP FOR SURFACING WITH WEAR-RESISTANT ALLOY

The present invention relates to surfacing materials and in particular to powder electrode strips for surfacing with wear-resistant alloys.

The invention should preferably be used for strengthening components working under microimpact and contact loading conditions. Exposed to such an effect may be, in particular, parts of hydroturbines and hydraulic presses, wheels of hoisting cranes, steel-teeming ladle trunnions, etc.

The intensification of operating conditions in the power, mechanical engineering and steel industries requires improvement in the working capacities and service life of equipment units. The manufacture of parts susceptible to wear from alloy steels is inexpedient from the economical point of view.

Greater savings are obtained by producing bimetallic parts wherein a billet of carbon or low alloy steel is overlayed with a wear-resistant alloy.

One of the methods of overlaying wear-resistant alloys is surfacing by arc welding. There is an iron-base alloy possessing high wear resistance which contains from 0.2 to 0.3 wt.% carbon, from 9 to 11 wt.% chromium from 9 to 11 wt.% manganese, up to 0.5 wt.% silicon, not more than 0.035 wt.% sulphur and phosphorus.

Well known in the art are methods of surfacing with this alloy by means of arc welding, these are: 1) manual arc welding using a metallic electrode made of 3-5 mm dia. wire of the above composition having a coating providing stable arc burning and protection of the molten metal; 2) mechanized carbon-dioxide-shielded and submerged arc welding using a welding wire of solid cross-section; 3) mechanized carbon-dioxide-shielded or open-arc welding using a powder wire produced from steel strip containing from 0.05 to 0.13 wt.% carbon, not less than 0.03 wt.% silicon, not more than 0.03 wt.% chromium, from 0.25 to 0.5 wt.% manganese, not more than 0.022 wt.% sulphur and phosphorus, the strip being rolled into a tube 2 to 3 mm in dia. enclosing a mixture consisting of 14 to 15 wt.% ferro-manganese, 13 to 14 wt.% metallic chrome, 3.5 to 4 wt.% ferro-titanium, 0.1 wt.% graphite, 1.8 to 2.5 wt.% iron powder.

Disadvantages of well-known surfacing materials consist in low productivity of the surfacing operation, considerable dilution of the metal deposit with a part of the base metal and, a greater possibility of flaw formation in the metal deposit.

Due to design and technological features of electrodes and powder welding wire the maximum productivity obtainable is 1.7 kg/hr when using electrodes and 4.5 kg/hr when employing a powder welding wire.

The dilution of the first layer of the alloy deposit with a part of the base metal when using well-known surfacing materials reaches 20 to 25%.

Such a situation may give rise to the formation of flaws, cracks and slag inclusions in the alloy deposit thereby making it necessary to employ multilayer surfacing and thoroughly remove all slag after each pass.

It is therefore an object of the present invention to provide a powder electrode strip for surfacing with a Wear-resistant alloy ensuring stable are burning, improvements in productivity, minimum penetration of the base metal part and formation of a wear-resistant alloy free from any defects.

The above object is attained by means of producing and applying a powder electrode strip for building up a wear-resistant alloy by open-arc welding. The power electrode strip comprises a steel shell filled up with a powdered mixture composed of metallic chromium, metallic iron, graphite, titanium compounds which in accordance with the invention contains also ferrochromium, crystalline silicon or silicocalcium, metallic manganese and metallic titanium, said components being taken in the following percentage proportions to the total weight of the powder electrode strip: from 1 to 1.2 wt.% ferrochromium with a 6-8 wt.% carbon content; from 12 to 13 wt.% metallic chrome; from 14 to 16 wt.% metallic manganese; from 0.6 to 0.8 wt.% crystalline silicon or silicocalcium, evaluated in terms of silicon; from 20 to 22 wt.% metallic iron, from 2 to 3 wt.% titanium dioxide, from 0.2 to 0.3 wt.% graphite and from 0.6 to 1 wt.% metallic titanium.

In order to reduce the tendency to vapour formation, it is preferable that apart from said components the mixture of the powder electrode strip should incorporate fluoro-polymers in a quantity of 0.5 to 3 wt.% of the strip total weight.

The powder electrode strip is favourable from the economical point of view since it does not contain nickel or any other deficit components.

Owing to the high manganese content, the alloy deposit obtained is apt to work hardening during plastic working. In this case work hardening results not only from plastic deformation but is caused by disintegration of structurally unstable austenite with the resulting formation of martensite and the E-phase.

As a result of microimpact loading occurring under conditions of high velocity fluid flows (parts of hydraulic machines) and contact loading taking place in the operation of steel-teeming ladle trunnions, the built-up surface layers get work hardened to a considerable extent, thereby materially improving cavitation- and wear-resistance properties thereof.

The surfaces of steel-teeming ladle trunnions (made of steel containing 0.17 to 0.24 wt.% carbon, 0.35 to 0.65 wt.% manganese, 0.17 to 0.37 wt.% silicon, not more than 0.25 wt.% chromium not more than 0.04 wt.% sulphur and phosphorus) overlayed with the powder electrode strip in accordance with the invention, after the 3 years' operation got worn out 1-2 mm on the radius whereas trunnions which had not been hardsurfaced experienced a 9 to 15 mm wear on the radius.

The deposition rate when surfacing with the powder electrode strip is from 14 to 16 kg/hr which means a three-fold increase as compared to surfacing using well-known materials.

The hardness of a single-layer deposit amounts to 260-280 HB (Brinell hardness number), that of a two-layer is from 230 to 240 HB.

When employing the present invention provision is made to obtain, in single-layer surfacing an alloy containing: 0.2 wt.% carbon, 9 wt.% chromium, 9.2 wt.% manganese; 0.2 wt.% silicon, 0.13 wt.% titanium, the balance, iron; in two-layer surfacing, an alloy containing 0.26 wt.% carbon, 10.8 wt.% manganese, 10.6 wt.% chromium, 0.35 wt.% silicon, 0.17 wt.% titanium and the balance, iron.

Mechanical properties of the metal deposit obtained with the application of the powder electrode strip in accordance with the invention are as follows:

Ultimate strength, kg/mm$^2$: 69.5
Yield strength, kg/mm$^2$: 40
Elongation, %: 13
Impact strength 20° C, kgfm/cm$^2$: 12.3

The microstructure of the metal obtained in single-layer and two-layer surfacing consists of austenite and fine-grained carbide dispersions. The surface layers have a fine equaxial grain structure. On approaching the weld joint columnar grain orientation becomes apparent.

The built-up surface can be readily machined, i.e. subjected to turning or planing using conventional metal cutting tools.

The use of the powder electrode strip in accordance with the invention enables the surfacing process to be mechanized or automated employing well-known and broadly used in the industry welding equipment (for instance, welding facilities designed by the Paton Electric Welding Institute).

The proposed, in accordance with the invention, composition of the powdered mixture makes it possible to perform surfacing using an open arc without additional protection of the molten alloy zone by means of flux or gas. Moreover, the metal deposit exhibits neither discontinuities nor pores.

The powder electrode strip in accordance with the invention obtains a well shaped deposit layer with no sharp variations in the surface level. Irregularities of the deposit surface range from 0.5 to 1 mm.

Furthermore, the surfacing operation is accomplished under conditions of minimum spatter and melting losses of the electrode strip material.

The powder electrode strip consumption amounts to 1.15 to 1.2 kg of the metal deposit. Other merits and advantages of the present invention will hereinafter become more apparent from the following detailed description of the invention.

In order to produce an alloy deposit with a wear-resistant grain structure, provide for proper metallurgical protection of the melting zone, appropriate shaping of the alloy deposit and the absence of flaws (pores, cracks) therein, in a powder electrode strip in combination with a shell made of steel containing from 0.05 to 0.13 wt.% carbon, less than 0.03 wt.% silicon, from 0.25 to 0.5 wt.% chromium, not more than 0.022 wt.% sulphur and phosphorus, there is used powdered mixture containing chromium, ferrochromium, graphite, manganese, titanium, siliococalcium or crystalline silicon, titanium dioxide and fluoropolymers.

Titanium dioxide is introduced into the powder strip mixture in a quantity of 2 to 3 wt.% to ensure stable arc burning and reduce molten metal spatter.

Should the titanium dioxide content be under 2 wt.%, no stable arc burning will be provided, molten metal spatter will be more pronounced and the appearance of the alloy deposit surface will be poor.

If the titanium dioxide content exceeds 3 wt.%, the required composition of the alloy deposit will not be provided since the titanium dioxide will occupy a considerable amount of the volume confined within the powder strip shell which will result in reducing the contents of the other components of the powdered mixture.

Ferrochromium, being an alloy of chromium and iron taken in a ratio of 2.6 to 1and containing from 6 to 8 wt.% carbon, according to the invention is introduced into the mixture in quantities from 1 to 1.2 wt.% with the view of incorporating carbon providing an adequate strength of the alloy deposit.

The upper limit of the above range, i.e. 1.2 wt.%, is determined by the possibility of obtaining a high quality alloy deposit free from cracks. In case of exceeding this limit, the carbon content of the alloy deposit will rise thereby improving the strength but lowering the plastic properties thereof. The lowering of the ferrochromium content below 1 wt.% will not provide for the required strength and wear resistance of the alloy deposit to be produced.

The manganese content of the mixture ranging from 14 to 16 wt.% gives an improvement in mechanical properties.

Owing to the high manganese content the steel becomes susceptible to work hardening when subjected to plastic deformation.

Moreover, manganese minimizes an adverse effect of sulphur and eliminates brittleness of alloys containing carbon. Manganese is also a good reducer.

An increase in the manganese content over 16 wt.% help to obtain an austenitic structure possessing high stability which exhibits no tendency to work hardening in the process of operation.

Reducing of the manganese content below 14 wt.% produces an alloy having high hardness (up to 50HR, Rockwell hardness) but low ductility.

It should also be noted that increasing the manganese content leads to worsening of the sanitary and hygienic conditions of the surfacing operation.

Titanium is introduced in the powder electrode strip mixture in quantities from 0.6 to 1 wt.% in accordance with the invention to improve plastic properties of the alloy deposit. The titanium introduced binds hydrogen into stable hydrides thereby preventing cracks and spalling from being formed in the alloy deposit.

When the titanium content of the mixture is less than 0.6 wt.% no improvement in plastic properties is observed and the tendency to crack formation becomes more apparent in the alloy. Exceeding of the upper limit of the titanium content of the mixture results in poor formation of the alloy deposit and causes metal spatter during the surfacing operation.

The presence in the powdered mixture of a fluoro-organic compounds, fluoro-polymers, usable for arc welding within a range of 0.5 to 0.3 wt.% ensures metallurgical protection of the melting zone by the virtue of binding the hydrogen of the arc atmosphere into stable fluorine hydride compounds which do not dissolve in the molten metal.

A decrease in the fluoro-polymer content of the mixture may result in vapour formation in the weld deposit due to inadequate protection of the melting zone from air ingress and the presence of hydrogen in the arc atmosphere. Exceeding of the upper limit of the fluoro-polymer content range above 3 wt.% will lead to an increase in carbon concentration in the alloy deposit over the allowable value with the resulting embrittlement thereof.

Silicon is introduced in the powder electrode strip mixture both in the crystalline form and as silicocalcium in a quantity of 0.6 to 0.8 wt.% which provides for its content from 0.35 to 0.5 wt.% in the alloy deposit. With the silicon content under 0.35 wt.% there is an appreciable increase in the alloy deposit tendency to the formation of coarse-grain microstructure. Moreover, a decrease in the silicon content leads to intensifying of chromium burning-out. Increasing the silicon content of the alloy deposit above 0.5 wt.% can initiate cracking since with an increase in the silicon content thickening of intercrystalline layers occurs. Such eutetics of silicon with iron, chromium and manganese have low melting temperatures, and being located on the boundaries of crystallites they may give rise to crystallization cracks.

Metallic chromium is incorporated to increase hardness, strength and heat resistance of the alloy deposit. A decrease in the chromium content below 12 wt.% will lead to the formation of stable austenite which is less susceptible to work hardening in service. An increase in the chromium content above 13 wt.% will lead to embrittlement as a result of the epsilon-phase formation in the alloy deposit structure.

Graphite is introduced for stabilization of the powder strip combustion process.

Reducing of the graphite content below 0.2% deteriorates the stability of the deposition process. An increase in the graphite content over 0.3% increases carbon content in the weld layer that increases cracking.

When putting the invention into practice the possible presence of undesirable additions in the powdered mixture should be taken into account.

To such undesirable additions lowering strength characteristics of the alloy deposit there belong sulphur and phosphorus. An increase in the phosphorus content above 0.04 wt.% enhances the alloy deposit susceptibility to cracking. Sulphur in combination with manganese forms a sulphide phase, MnS, having an elevated melting temperature. Therefore, an increase in the sulphur content does not sharply increase the alloy deposit susceptibility to cracking but it does increase the quantity of non-metallic inclusions therein.

The increased sulphide-phase content leads to weakening of intercrystalline bonds thereby substantially decreasing mechanical properties. Therefore, the sulphur content should be kept to a minimum. Good results have been obtained with the sulphur content in the alloy deposit of not more than 0.03 wt.%.

The proposed powder electrode strip is manufactured by any of the known methods preferably using processing technology and equipment designed by the Paton Electric Welding Institute.

The electrode strip, in accordance with the invention, consists of a steel shell rectangular in cross-section which is preferably made up of two portions, an upper and a lower one, and powdered mixture uniformity distributed within the steel shell interior.

It is preferable that the components of the powdered mixture be in the form of a powder fraction passing through a screen with 400 meshes per 1 cm$^2$.

The powder should not contain dust capable of passing through a screen with 3600 meshes per 1 cm$^2$.

The powdered mixture components are taken in quantities providing for their content in the powder electrode strip in the following weight percentage proportions:
  ferochromium; 1 to 1.2
  metallic chromium: 12 to 13
  metallic manganese: 14 to 16
  crystalline silicon or silicocalcium taken in terms of silicon: 0.6 to 0.8
  metallic iron: 20 to 22
  titanium dioxide: 2 to 3
  polytetrafluoroethylene: 0.5 to 3,
  graphite: 0.2 to 0.3

These being blended in a mixer until a uniform mass is obtained. The resulting mixture is used for filling up the lower portion of the steel shell being rectangular in cross-section. After this has been done, the shell lower portion is covered with its upper one with their edges being roller bended. Then the powdered mixture undergoes compaction by rolling thereof in compacting rolls.

The filling coefficient of the powder electrode strip being a ratio of the powdered mixture mass to the powder electrode strip mass and expressed in percent depending on the analysis of the mixture components may be chosen within a range of 48–53%.

The powder electrode strip produced by the above technique was employed for surfacing carbon steel components such as trunnions of steel-teeming ladles with a wear-resistant alloy.

Weld overlaying of steel surfaces with the powder electrode strip according to the invention was conducted under the following operating conditions: a welding current (d.c., of reserve polarity) of 550 to 700A; arc voltage from 22 to 26 V; welding speed of 26 to 35 m/hr.

Given below are typical examples of carrying out the invention.

EXAMPLE 1

A powder electrode strip consisting of a shell made of steel containing: 0.05 wt.% carbon; 0.25 wt.% manganese; 0.02 wt.% chromium; 0.02 wt.% sulphur; 0.018 wt.% phosphorus; 0.02 wt.% silicon; the balance being iron and powdered mixture containing: 1 wt.% ferrochromium with a 8 wt.% carbon content; 12 wt.% metallic chromium; 14 wt.% metallic manganese; 0.7 wt.% crystalline silicon; 0.2 wt.% graphite; 0.6wt.% metallic titanium; 3.0 wt.% titanium dioxide and 22. wt.% iron powder; was manufactured with the filling coefficient of 52% and used for surfacing of 500×300×25 low carbon steel plates and carbon steel trunnions of 230-ton steel-teeming ladles.

Surfacing was performed by open-arc two-layer welding on an automatic welder under the following operating conditions: a welding current (d.c., of reverse polarity) of 600 to 650A, arc voltage at 22 to 24V, welding speed of 26 m/hr. The hardness of the second layer of the alloy deposit was 220 to 240 HB.

When the built-up components were tested under a load of 50 kg/cm$^2$ on a machine providing a reciprocating motion of the flat surfaces of pairs being in friction contact, the wear thereof was 0.25 g. During this test the samples rested against a low carbon steel plate with their hardsurfaced areas.

Under production conditions, the surfaces of steel-teeming ladle trunnions made from steel containing: from 0.17 to 0.24 wt.% carbon, from 0.35 to 0.65 wt.% manganese, from 0.17 to 0.37 wt.% silicon, not more than 0.25 wt.% chromium, not more than 0.04 wt.% sulphur and phosphorus, the balance, being iron, were worn from 1 to 2 mm on the radius after three years of operation. The wear of ladle trunnions not subjected to surfacing was from 9 to 15 mm on the radius after the same period of service under similar conditions.

EXAMPLE 2

A powder electrode strip comprising a shell having a steel analysis equivalent to that described in example 1 and powdered mixture containing 1.2 wt.% ferrochromium with a 6.0 wt.% carbon content; 13 wt.% metallic chromium; 0.3 wt.% graphite; 16 wt.% metallic manganese; 0.8 wt.% silicocalcium evaluated in terms of silicon; 1. wt.% metallic titanium; 20. wt.% metallic iron; 2 wt.% titanium dioxide was produced with the filling coefficient of 53% and used for automatic surfacing with a wear-resistant alloy by means of open-arc one-layer welding. The built-up surface hardness was from 260 to 280 HB.

EXAMPLE 3

Under conditions similar to those described in example 1 a surfacing procedure was performed using a powder electrode strip whose mixture in addition to said components contained also polytetrafluorethylene in a quantity of 3 wt.% of the total powder strip weight.

The alloy deposit hardness was 220 to 240 HB.

EXAMPLE 4

Under conditions similar to those described in example 2, a surfacing operation was carried out using a powder electrode strip whose mixture in addition to said components contained also polytetrafluoroethylene in a quantity of 0.5 wt.% of the total powder strip weight. Hardness of the alloy deposit was from 260 to 280 HB.

We claim:

1. A powder electrode strip for surfacing with a wear-resistant alloy comprising a steel shell filled with a powdered mixture consisting essentially of, by weight of the powder electrode strip, from 12 to 13% chromium, from 20 to 22% iron, from 0.2 to 0.3% graphite, from 1 to 1.2% ferrochromium having 0.6 to 0.8% carbon, 0.6 to 0.8% of crystalline silicon or silicocalcium with the silicon content being not less than 60& of the silicocalcium, from 14 to 16% manganese, from 0.6 to 1% titanium, from 2 to 3% titanium dioxide and the balance is the iron represented by the steel shell.

2. The powder electrode of claim 1 wherein the powder mixture also contains from 0.5 to 3% by weight of the electrode strip of polytetrafluorethylene.

* * * * *